US012794643B2

(12) United States Patent
Wang et al.

(10) Patent No.: US 12,794,643 B2
(45) Date of Patent: Nov. 10, 2026

(54) DATA TRANSMISSION METHOD, APPARATUS, AND SYSTEM

(71) Applicant: HUAWEI TECHNOLOGIES CO., LTD., Shenzhen (CN)

(72) Inventors: Zhenzhong Wang, Shanghai (CN); Yanjie Gu, Shenzhen (CN); Ya Liu, Shanghai (CN); Yu Zhang, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 244 days.

(21) Appl. No.: 18/606,867

(22) Filed: Mar. 15, 2024

(65) Prior Publication Data

US 2024/0223339 A1 Jul. 4, 2024

Related U.S. Application Data

(63) Continuation of application No. PCT/CN2021/119466, filed on Sep. 18, 2021.

(51) Int. Cl.
*H04L 5/00* (2006.01)
*H04L 1/1607* (2023.01)
(Continued)

(52) U.S. Cl.
CPC .......... *H04L 5/0053* (2013.01); *H04L 1/1642* (2013.01); *H04L 61/50* (2022.05); *H04L 2101/622* (2022.05)

(58) Field of Classification Search
CPC ..... H04L 5/0053; H04L 1/1642; H04L 61/50; H04L 2101/622; H04L 1/1864
See application file for complete search history.

(56) References Cited

U.S. PATENT DOCUMENTS 8,023,453 B2 * 9/2011 Sammour ............. H04L 12/189 370/328
2011/0116435 A1 * 5/2011 Liu ....................... H04L 12/189 370/312

(Continued)

FOREIGN PATENT DOCUMENTS

CN 106254043 A 12/2016

OTHER PUBLICATIONS

"IEEE Standard for Information technology—Telecommunications and information exchange between systems Local and metropolitan area networks—Specific requirements, Part 11: Wireless LAN Medium Access Control (MAC) and Physical Layer (PHY) Specifications," IEEE Computer Society, IEEE Std 802.11™-2016 (Revision of IEEE Std. 802.11-2012), total 3534 pages, Institute of Electrical and Electronics Engineers, New York, New York (Dec. 2016).

*Primary Examiner* — Will W Lin
(74) *Attorney, Agent, or Firm* — Leydig, Voit & Mayer, Ltd.

(57) ABSTRACT

Disclosed are a data transmission method, apparatus, and system. The data transmission method includes: sending a first multicast frame to a plurality of terminal devices; receiving multicast block acknowledgment frames respectively sent by the plurality of terminal devices, where the multicast block acknowledgment frame sent by the terminal device includes an acknowledgment field that indicates whether the terminal device receives at least one frame included in the first multicast frame; and when determining, based on the acknowledgment field included in the multicast block acknowledgment frame sent by any terminal device in the plurality of terminal devices, that the any terminal device does not receive a target frame in the first multicast frame, resending the target frame to the plurality of terminal devices. Thus, multicast frame transmission efficiency can (Continued)

be improved while ensuring multicast frame transmission reliability.

16 Claims, 5 Drawing Sheets

(51) Int. Cl.
*H04L 61/50* (2022.01)
*H04L 101/622* (2022.01)

(56) References Cited

U.S. PATENT DOCUMENTS

| | | | | |
|---|---|---|---|---|
| 2011/0286377 | A1* | 11/2011 | Sampath | H04L 1/1671 370/312 |
| 2015/0312953 | A1* | 10/2015 | Wang | H04L 1/1864 370/312 |
| 2016/0142185 | A1* | 5/2016 | Merlin | H04L 12/189 370/312 |
| 2018/0115433 | A1* | 4/2018 | Morioka | H04L 5/0094 |
| 2019/0150021 | A1* | 5/2019 | Sugaya | H04L 1/189 370/230 |
| 2020/0037288 | A1 | 1/2020 | Huang et al. | |
| 2021/0044410 | A1* | 2/2021 | Morioka | H04L 12/1868 |

* cited by examiner

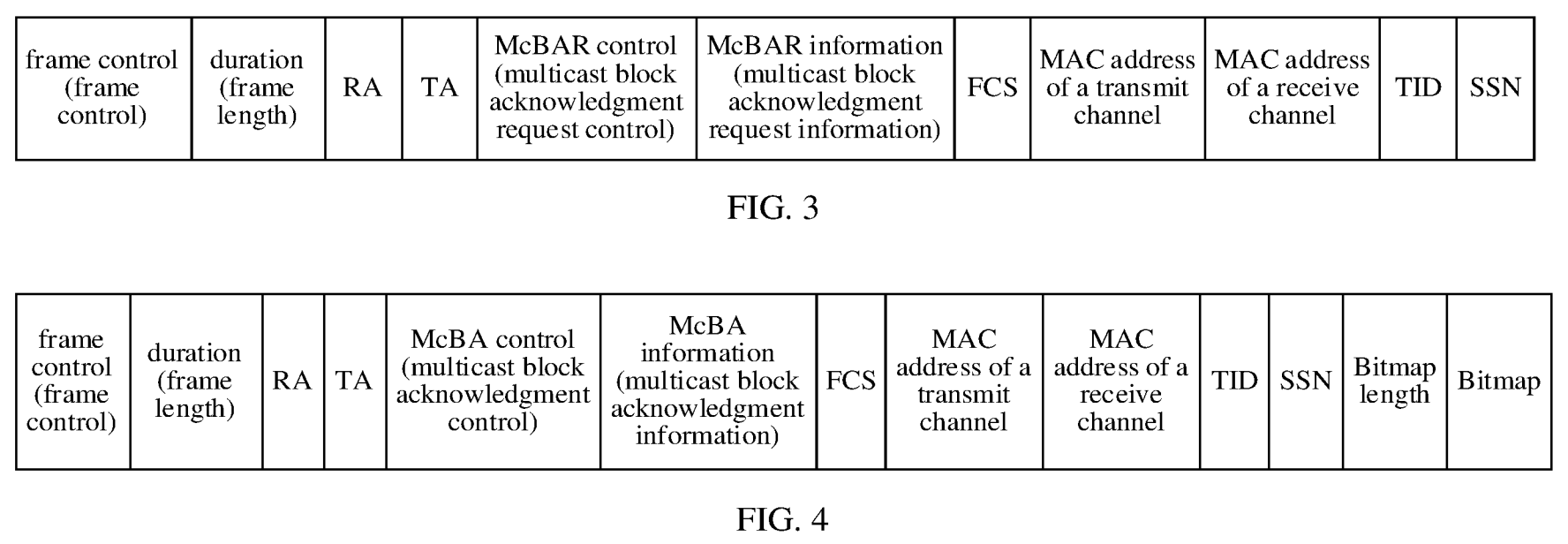

| frame control (frame control) | duration (frame length) | RA | TA | McBAR control (multicast block acknowledgment request control) | McBAR information (multicast block acknowledgment request information) | FCS | MAC address of a transmit channel | MAC address of a receive channel | TID | SSN |
|---|---|---|---|---|---|---|---|---|---|---|

FIG. 3

| frame control (frame control) | duration (frame length) | RA | TA | McBA control (multicast block acknowledgment control) | McBA information (multicast block acknowledgment information) | FCS | MAC address of a transmit channel | MAC address of a receive channel | TID | SSN | Bitmap length | Bitmap |
|---|---|---|---|---|---|---|---|---|---|---|---|---|

FIG. 4

DATA TRANSMISSION METHOD, APPARATUS, AND SYSTEM

CROSS-REFERENCE TO RELATED APPLICATIONS

This application is a continuation of International Application No. PCT/CN2021/119466, filed on Sep. 18, 2021, the disclosure of which is hereby incorporated by reference in its entirety.

TECHNICAL FIELD

This application relates to the field of wireless technologies, and in particular, to a data transmission method, apparatus, and system.

BACKGROUND

With development of wireless technologies, multicast communication may be implemented between an access device and a plurality of terminal devices, and the access device may simultaneously send data to the plurality of terminal devices.

Currently, the access device sends multicast frames to the plurality of terminal devices, and resends each multicast frame to the plurality of terminal devices for a preset quantity of times, to ensure that each terminal device can receive the multicast frame.

In a process of transmitting the multicast frames, each multicast frame needs to be retransmitted for the preset quantity of times. Consequently, data transmission efficiency is low.

SUMMARY

This application provides a data transmission method, apparatus, and system, to improve multicast frame transmission efficiency while ensuring multicast frame transmission reliability.

According to a first aspect, this application provides a data transmission method. The method includes: sending a first multicast frame to a plurality of terminal devices; receiving multicast block acknowledgment frames respectively sent by the plurality of terminal devices, where the multicast block acknowledgment frame sent by the terminal device includes an acknowledgment field, and the acknowledgment field indicates whether the terminal device receives at least one frame included in the first multicast frame; and when determining, based on the acknowledgment field included in the multicast block acknowledgment frame sent by any terminal device in the plurality of terminal devices, that the any terminal device does not receive a target frame in the first multicast frame, resending the target frame to the plurality of terminal devices.

In the method, when determining, based on the multicast block acknowledgment frame sent by the any terminal device in the plurality of terminal devices, that the any terminal device does not receive the target frame in the first multicast frame, an access device resends the target frame to the plurality of terminal devices, so that only a frame that is not received by the terminal device needs to be resent, and a frame that has been received by the terminal device does not need to be sent for a plurality of times. This ensures multicast frame transmission reliability and improves multicast frame transmission efficiency.

In a possible implementation, the first multicast frame includes a plurality of frames, and the method further includes: obtaining the plurality of frames; aggregating the plurality of frames to obtain at least one aggregated frame, where the at least one aggregated frame forms the first multicast frame; and the sending a first multicast frame to a plurality of terminal devices includes: sequentially sending the at least one aggregated frame to the plurality of terminal devices.

The plurality of frames are stored in a cache queue of the access device. The access device may first determine an aggregation quantity, and then invoke the aggregation quantity of frames from the plurality of frames cached in the cache queue and perform aggregation. A destination address of the multicast frame is a plurality of multicast addresses. Optionally, the plurality of frames may be aggregated by using a frame aggregation technology, to aggregate some or all of the plurality of frames into an aggregated frame.

After the plurality of frames are aggregated, only one physical layer convergence protocol header and one physical layer convergence protocol preamble need to be added to the plurality of frames, thereby reducing quantities of physical layer convergence protocol headers and physical layer convergence protocol preambles that are required for sending the plurality of frames (that is, sending the first multicast frame), and improving a throughput rate of a data transmission system during data transmission.

In a possible implementation, the method further includes: when the multicast block acknowledgment frame sent by the any terminal device is not received, sending a multicast block acknowledgment request frame to the any terminal device, where the multicast block acknowledgment request frame includes an acknowledgment request field, and the acknowledgment request field is for requesting a status of receiving the at least one frame by the any terminal device; and the receiving multicast block acknowledgment frames respectively sent by the plurality of terminal devices includes: receiving the multicast block acknowledgment frame sent by the any terminal device based on the acknowledgment request field included in the multicast block acknowledgment request frame.

In a possible implementation, the first multicast frame is located in a target priority queue, the at least one frame each has a frame sequence number, and the frame sequence number of the at least one frame is within a frame sequence number range of a send window corresponding to the target priority queue. A value of the acknowledgment request field is a current start frame sequence number of the send window corresponding to the target priority queue, and the acknowledgment request field is for requesting a status of receiving, by the any terminal device, a frame with each frame sequence number in the send window corresponding to the target priority queue.

In a possible implementation, the multicast block acknowledgment request frame further includes multicast location information, and the terminal device is configured to determine the first multicast frame from a plurality of received multicast frames based on the multicast location information.

In a possible implementation, the multicast location information includes a media access control MAC address field of a transmit channel, a MAC address field of a receive channel, and a traffic identifier TID field. The MAC address field of the transmit channel indicates a MAC address of a channel that is in the access device and that is for generating the multicast block acknowledgment request frame, the MAC address field of the receive channel indicates a MAC address of a channel that is in the terminal device and that is for processing the multicast block acknowledgment request frame, and the TID field indicates the target priority queue.

In a possible implementation, a transmit channel of the first multicast frame is different from a transmit channel of the multicast block acknowledgment request frame, and the transmit channel of the first multicast frame is different from a receive channel of the multicast block acknowledgment frame.

For example, a link is established between the access device and each terminal device through an actual channel, and then a virtual link may be established between the access device and each terminal device to obtain a virtual channel. The access device sends the first multicast frame and the multicast block acknowledgment request frame through different virtual channels, and sends the first multicast frame and receives the multicast block acknowledgment frame through different channels.

The virtual channel may include a 5 gigahertz (GHz, G) channel, a 2.4G channel, a sixth generation mobile communication technology channel, a channel on Bluetooth (BT), and a channel on hardware such as Bluetooth low energy (BLE). This is not limited in this embodiment of this application.

In this embodiment of this application, quantities of times of sending the multicast block acknowledgment request frame and the multicast block acknowledgment frame are related to a quantity of terminal devices. When the quantity of terminal devices increases, air interface resources occupied by the multicast block acknowledgment request frame and the multicast block acknowledgment frame also increase. The transmit channel of the first multicast frame is different from the transmit channel of the multicast block acknowledgment request frame, and a receive channel of the first multicast frame is different from a receive channel of the multicast block acknowledgment request frame. This can avoid impact of the multicast block acknowledgment request frame and the multicast block acknowledgment frame on sending and receiving of the first multicast frame when there are a large quantity of terminal devices, so that a throughput rate of the first multicast frame is not affected by the multicast block acknowledgment request frame and the multicast block acknowledgment frame.

In a possible implementation, the resending the target frame to the plurality of terminal devices includes: repeatedly performing a retransmission process until a retransmission end condition is satisfied. The retransmission process includes: sending the target frame to the plurality of terminal devices; receiving the multicast block acknowledgment frames sent by the plurality of terminal devices; and determining, based on the multicast block acknowledgment frames, whether the plurality of terminal devices each receive the target frame. The retransmission end condition includes at least one of the following: a quantity of times of repeated sending is greater than a quantity-of-times threshold and the terminal device still does not receive the target frame, the plurality of terminal devices each receive the target frame, and duration of the retransmission process is greater than a duration threshold.

In a possible implementation, the first multicast frame is located in the target priority queue, the at least one frame each has a frame sequence number, the frame sequence number of the at least one frame is within the frame sequence number range of the send window corresponding to the target priority queue, and the sending the target frame to the plurality of terminal devices includes: aggregating the target frame and at least one current to-be-transmitted frame to obtain a second multicast frame, where a frame sequence number of the at least one to-be-transmitted frame is within the frame sequence number range of the send window corresponding to the target priority queue; and sending the second multicast frame to the plurality of terminal devices.

A to-be-transmitted multicast frame includes an unsent frame and/or the target frame in a multicast frame sent after the first multicast frame. The retransmission process may be performed after the access device completes sending the first multicast frame currently being sent, or may be performed after the access device sends, to the plurality of terminal devices, a frame with an end frame sequence number of the send window corresponding to the target priority queue. A performing moment of the process is not limited in this embodiment of this application.

In a possible implementation, the first multicast frame is located in the target priority queue, the at least one frame each has a frame sequence number, the frame sequence number of the at least one frame is within the frame sequence number range of the send window corresponding to the target priority queue, a minimum frame sequence number of the at least one frame is the start frame sequence number of the send window corresponding to the target priority queue, and the method further includes: updating the frame sequence number range when a frame with the minimum frame sequence number in the at least one frame is a non-target frame. For example, the start frame sequence number of the send window corresponding to the target priority queue may be updated to a minimum frame sequence number in the target frame.

According to a second aspect, this application provides a data transmission method. The method includes: receiving at least one first multicast frame sent by a sending access device, where the at least one first multicast frame is located in a target priority queue, each of the at least one first multicast frame has a frame sequence number, and the at least one frame sequence number is within a frame sequence number range of a receive window corresponding to the target priority queue; and sending a multicast block acknowledgment frame to the access device, where the multicast block acknowledgment frame includes an acknowledgment field, the acknowledgment field indicates whether at least one frame included in the first multicast frame is received, and when determining, based on the acknowledgment field included in the multicast block acknowledgment frame, that a target frame in the first multicast frame is not received, the access device is configured to resend the target frame.

When the first multicast frame is received, a priority of the first multicast frame may be determined, and then the first multicast frame is placed in a priority queue corresponding to the determined priority for subsequent processing.

In a possible implementation, the at least one frame forms at least one aggregated frame.

In a possible implementation, the first multicast frame is located in the target priority queue, the at least one frame each has a frame sequence number, and a frame sequence number of any frame in the at least one frame is within the frame sequence number range of the receive window corresponding to the target priority queue or is less than a start frame sequence number of the receive window corresponding to the target priority queue; and the acknowledgment field indicates a status of receiving a frame with each frame sequence number in the receive window corresponding to the target priority queue.

In a possible implementation, the multicast block acknowledgment frame further includes multicast location information, and the access device is configured to determine, based on the multicast location information, that the acknowledgment field indicates a status of receiving the first multicast frame.

In a possible implementation, the multicast location information includes a media access control MAC address field of a transmit channel, a MAC address field of a receive channel, and a traffic identifier TID field. The MAC address field of the transmit channel indicates a MAC address of a channel that is in a terminal device and that is for generating the multicast block acknowledgment frame, the MAC address field of the receive channel indicates a MAC address of a channel that is in the access device and that is for processing the multicast block acknowledgment frame, and the TID field indicates the target priority queue.

In a possible implementation, the sending a multicast block acknowledgment frame to the access device includes: receiving a multicast block acknowledgment request frame sent by the access device, where the multicast block acknowledgment request frame includes an acknowledgment request field, and the acknowledgment request field is for requesting a status of receiving the at least one frame; and sending the multicast block acknowledgment frame to the access device based on the acknowledgment request field included in the multicast block acknowledgment request frame.

In a possible implementation, a receive channel of the first multicast frame is different from a receive channel of the multicast block acknowledgment request frame, and the receive channel of the first multicast frame is different from a transmit channel of the multicast block acknowledgment frame.

In a possible implementation, the method further includes: updating the frame sequence number range of the receive window corresponding to the target priority queue based on the multicast block acknowledgment request frame.

The multicast block acknowledgment request frame is for requesting a status of receiving a data frame with each frame sequence number in a send window corresponding to the target priority queue. This indicates that the access device does not need to determine a status of receiving a frame before a start frame sequence number of the send window corresponding to the target priority queue. Therefore, the frame sequence number range of the receive window corresponding to the target priority queue may be updated based on the multicast block acknowledgment request frame. For example, the start frame sequence number of the receive window corresponding to the target priority queue may be updated to a value of the acknowledgment request field included in the multicast block acknowledgment request frame.

In a possible implementation, the method further includes: updating the frame sequence number range of the receive window corresponding to the target priority queue based on the received first multicast frame.

In a first example, a frame sequence number of any frame in the first multicast frame is within the frame sequence number range of the receive window corresponding to the target priority queue. When the frame sequence number of the any frame is the start frame sequence number of the receive window corresponding to the target priority queue, the terminal device increases the start frame sequence number of the receive window corresponding to the target priority queue by one, and increases an end frame sequence number by one. The rest can be deduced by analogy until the first multicast frame does not include a frame with a current start frame sequence number of the receive window corresponding to the target priority queue. In another example, a frame sequence number of any frame in the first multicast frame is outside the frame sequence number range of the receive window corresponding to the target priority queue. The terminal device may directly update the start frame sequence number of the receive window corresponding to the target priority queue to the frame sequence number of the any frame, and correspondingly change the end frame sequence number of the receive window corresponding to the target priority queue.

According to a third aspect, this application provides an interface device, including: one or more processors; and a memory, configured to store one or more computer programs or instructions. When the one or more computer programs or the instructions are executed by the one or more processors, the one or more processors are enabled to implement the method according to any one of the first aspect.

According to a fourth aspect, this application provides a terminal device, including: one or more processors; and a memory, configured to store one or more computer programs or instructions. When the one or more computer programs or the instructions are executed by the one or more processors, the one or more processors are enabled to implement the method according to any one of the second aspect.

According to a fifth aspect, this application provides a computer-readable storage medium, including a computer program or instructions. When the computer program or the instructions are executed on a computer, the computer is enabled to perform the method according to any one of the first aspect or the second aspect.

According to a sixth aspect, this application provides a computer program product. The computer program product includes computer program code, and when the computer program code is run on a computer, the computer is enabled to perform the method according to any one of the first aspect or the second aspect.

According to a seventh aspect, this application provides a data transmission system. The data transmission system includes the access device according to the third aspect and the terminal device according to the fourth aspect.

BRIEF DESCRIPTION OF DRAWINGS

FIG. 3 is a schematic diagram of a structure of an McBAR frame according to an embodiment of this application;

FIG. 4 is a schematic diagram of a structure of an McBA frame according to an embodiment of this application;

DESCRIPTION OF EMBODIMENTS

To make the objectives, technical solutions, and advantages of this application clearer, the following clearly and completely describes the technical solutions of this application with reference to the accompanying drawings in embodiments of this application. It is clear that the described embodiments are merely a part rather than all of embodiments of this application. All other embodiments obtained by a person of ordinary skill in the art based on embodiments of this application without creative efforts shall fall within the protection scope of this application.

In this specification, embodiments, claims, and accompanying drawings of this application, terms “first”, “second”, and the like are merely intended for distinguishing and description, and shall not be understood as an indication or implication of relative importance or an indication or implication of an order. In addition, the terms “include”, “have”, and any variant thereof are intended to cover non-exclusive inclusion, for example, include a series of steps or units. Methods, systems, products, or devices are not necessarily limited to those steps or units that are literally listed, but may include other steps or units that are not literally listed or that are inherent to such processes, methods, products, or devices.

It should be understood that in this application, “at least one (item)” refers to one or more and “a plurality of” refers to two or more. The term “and/or” is used for describing an association relationship between associated objects, and represents that three relationships may exist. For example, “A and/or B” may represent the following three cases: Only A exists, only B exists, and both A and B exist, where A and B may be singular or plural. The character “/” generally indicates an “or” relationship between the associated objects. “At least one of the following” or a similar expression thereof indicates any combination of the following, including any combination of one or more of the following. For example, at least one of a, b, or c may indicate a, b, c, a and b, a and c, b and c, or a, b, and c, where a, b, and c may be singular or plural.

With development of wireless technologies, multicast communication may be implemented between an access device and a plurality of terminal devices by using the field of wireless fidelity (Wi-Fi) technologies.

Figure 1:
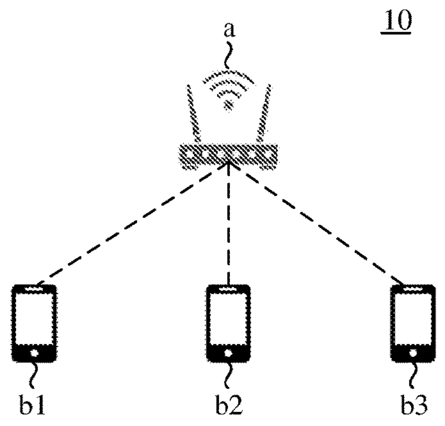
FIG. 1 is a schematic diagram of a structure of a data transmission system according to an embodiment of this application.

An embodiment of this application provides a Wi-Fi technology-based data transmission system. Refer to FIG. 1. FIG. 1 is a schematic diagram of a structure of a data transmission system according to an embodiment of this application. The data transmission system 10 is a wireless local area network (WLAN) system. The data transmission system 10 includes an access device a and three terminal devices b1 to b3 associated with the access device a. The terminal devices b1 to b3 are associated with the access device a, which means that each terminal device in the terminal devices b1 to b3 has established a link to the access device a in a wireless manner, that is, each terminal device can perform wireless communication with the access device.

The access device may include an access point (AP), and the terminal device may include a terminal station (station, STA). For example, the AP may include a network device such as a base station, a router, or a switch that supports a WLAN, and the STA may include an access terminal, a terminal unit, a terminal station, a mobile station, a mobile console, a remote station, a remote terminal, a mobile device, a wireless communication device, a terminal agent, a terminal apparatus, or the like. The access terminal may include a cellular phone, a cordless phone, a session initiation protocol (SIP) phone, a wireless local loop (WLL) station, a personal digital assistant (PDA), a handheld device with a wireless communication function, a computing device, another processing device connected to a wireless modem, an in-vehicle device, or a wearable device.

It should be noted that the data transmission system shown in FIG. 1 is merely an example for description, and does not limit a structure of the data transmission system and a quantity of the data transmission system.

In a conventional technology, an access device usually sends multicast frames to a plurality of terminal devices at a conventional rate (also referred to as legacy rate), to implement multicast communication. When receiving the multicast frame, the terminal device does not send an acknowledgment response to the access device. Therefore, the access device needs to resend each multicast frame to the plurality of terminal devices for a preset quantity of times, so that each terminal device can receive the multicast frame. However, in this data transmission manner, each multicast frame needs to be transmitted for the preset quantity of times. Consequently, data transmission efficiency is low, an air interface resource occupation is high, and work of another device that uses a same air interface resource is affected. In addition, a maximum throughput rate that can be supported in a data transmission process is small, and cannot be applied to transmission of traffic-intensive data (for example, a high-definition video). In addition, in the conventional technology, it cannot be ensured that each terminal device can receive the multicast frame, resulting in poor data transmission reliability. The air interface resource is a radio channel resource.

The conventional technology further provides another data transmission manner, and an access device sends a unicast frame to each terminal device. However, as a quantity of terminal devices increases, each terminal device can occupy a smaller bandwidth in a data transmission process. Consequently, in the data transmission process between the access device and each terminal device, a throughput rate is reduced, a delay is increased, and data transmission efficiency is low, which cannot be applied to transmission of the traffic-intensive data. In addition, an air interface resource occupation is high, which affects work of another device that uses a same air interface resource.

Figure 2:
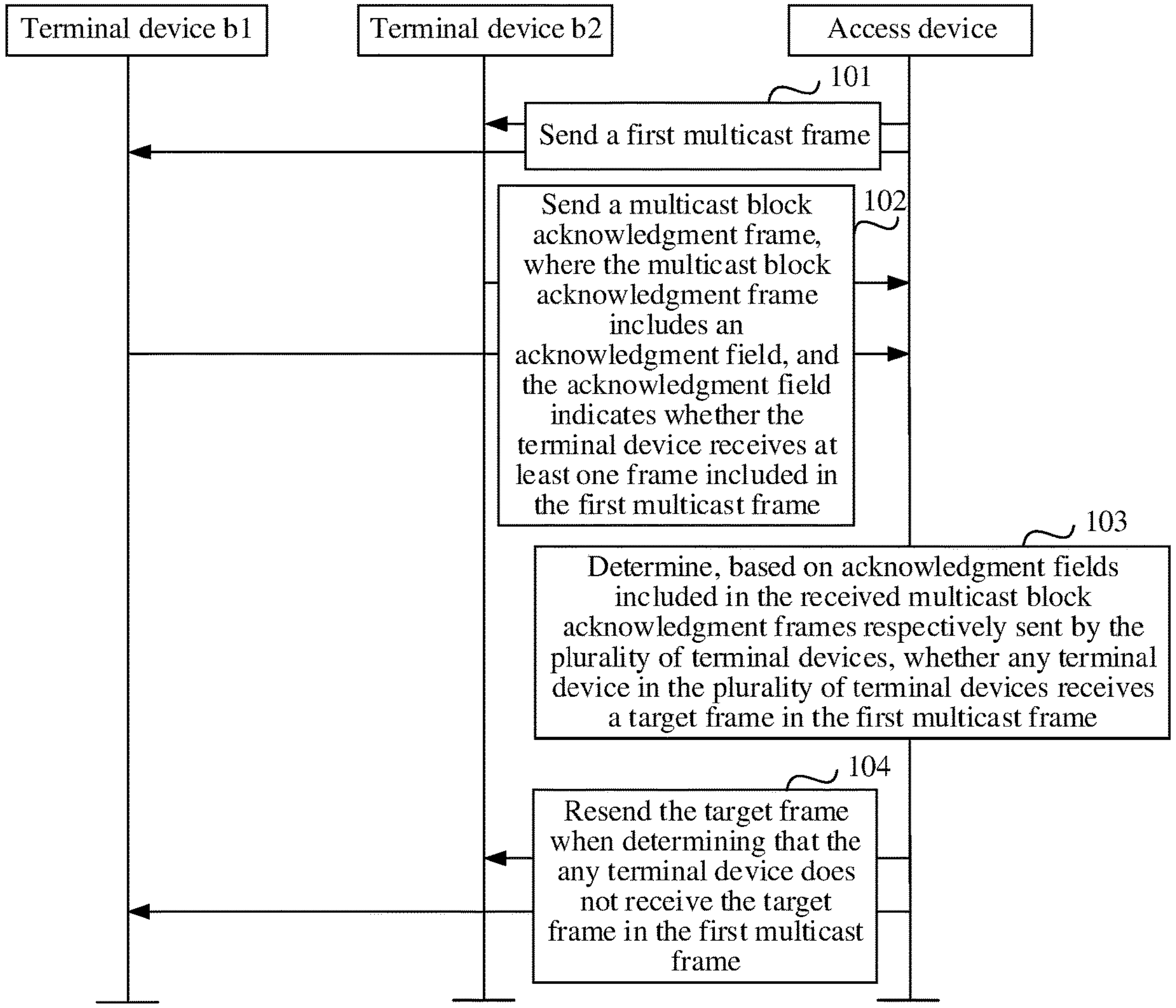
FIG. 2 is a schematic flowchart of a data transmission method according to an embodiment of this application.

An embodiment of this application provides a data transmission method. The data transmission method may be applied to the foregoing data transmission system, for example, applied to the access device and the plurality of terminal devices in the foregoing data transmission system. Refer to FIG. 2. FIG. 2 is a schematic flowchart of a data transmission method according to an embodiment of this application. In FIG. 2, an example in which the method is applied to an access device and two terminal devices b1 and b2 is used for description. The method may include the following processes.

101: An access device sends a first multicast frame to a plurality of terminal devices.

The first multicast frame includes at least one frame. It should be noted that the first multicast frame sent by the access device has a priority, multicast frames of a same priority are located in a same priority queue, and each priority queue corresponds to a send window. Each priority queue and the corresponding send window are independent of each other. The priority of the first multicast frame generally includes the following four categories: access category background (AC_BK), access category best effort (AC_BE), access category video (AC_VI), and access category voice (AC_VO). The first multicast frame is located in a target priority queue, and the target priority queue may be a queue of any one of the foregoing priorities. The priority may be indicated by a traffic identifier (TID) field carried in the first multicast frame.

The at least one frame each has a frame sequence number (SN), and the frame sequence number of the at least one frame is within a frame sequence number range of a send window corresponding to the target priority queue. In this embodiment of this application, transmission of multicast frames in the target priority queue is used as an example for description. For transmission of multicast frames in each priority queue, refer to this embodiment of this application. Details are not described herein again.

The at least one frame is a media access control (MAC) protocol data unit (MAC PDU, MPDU), and a destination address of the at least one frame is MAC addresses of the plurality of terminal devices. When there are a plurality of frames in the first multicast frame, the access device may sequentially send the plurality of frames to the plurality of terminal devices. Alternatively, the access device may first aggregate the plurality of frames to obtain at least one aggregated frame, where the at least one aggregated frame forms the first multicast frame, and then sequentially send the at least one aggregated frame to the plurality of terminal devices.

The plurality of frames are stored in a cache queue of the access device. The access device may first determine an aggregation quantity, and then invoke the aggregation quantity of frames from the plurality of frames cached in the cache queue and perform aggregation. A destination address of the multicast frame is a plurality of multicast addresses.

Optionally, the plurality of frames may be aggregated by using a frame aggregation technology, to aggregate some or all of the plurality of frames into an aggregated frame. A physical layer convergence protocol header (PLCPHeader) is added to a frame header of each aggregated frame, and a PLCP preamble (PLCPPreamble) is added to a frame tailer of each aggregated frame. When the plurality of frames are not aggregated, a PLCPHeader and a PLCPPreamble need to be respectively added to a frame header and a frame trailer of each frame. After aggregation, only one PLCPHeader and one PLCPPreamble need to be added to the plurality of frames, thereby reducing quantities of PLCPHeaders and PLCPPreambles that are required for sending the plurality of frames (that is, sending the first multicast frame), and improving a throughput rate of a data transmission system during data transmission.

In the process 101, as shown in FIG. 2, the access device may send the first multicast frame to the terminal device b1 and the terminal device b2.

102: The terminal device sends a multicast block acknowledgment frame to the access device, where the multicast block acknowledgment frame includes an acknowledgment field, and the acknowledgment field indicates whether the terminal device receives the at least one frame included in the first multicast frame.

The first multicast frame received by the terminal device may include at least one frame or at least one aggregated frame.

Corresponding to the access device, when receiving the first multicast frame, the terminal device determines a priority of the first multicast frame, and then places the first multicast frame in a priority queue corresponding to the determined priority for subsequent processing. As described in the foregoing process 101, the terminal device may determine the priority of the multicast frame based on the TID field in the first multicast frame. Each priority queue in the terminal device corresponds to one receive window.

The at least one frame included in the first multicast frame that is sent by the access device and that is received by the terminal device each has a frame sequence number. In this case, a frame sequence number of any frame in the at least one frame is within or outside a frame sequence number range of a receive window corresponding to the target priority queue.

The terminal device may update the frame sequence number range of the receive window corresponding to the target priority queue based on the received first multicast frame. In a first example, a frame sequence number of any frame in the first multicast frame is within the frame sequence number range of the receive window corresponding to the target priority queue. When the frame sequence number of the any frame is a start frame sequence number of the receive window corresponding to the target priority queue, the terminal device increases the start frame sequence number of the receive window corresponding to the target priority queue by one, and increases an end frame sequence number by one. The rest can be deduced by analogy until the first multicast frame does not include a frame with a current start frame sequence number of the receive window corresponding to the target priority queue. In another example, a frame sequence number of any frame in the first multicast frame is outside the frame sequence number range of the receive window corresponding to the target priority queue. The terminal device may directly update a start frame sequence number of the receive window corresponding to the target priority queue to the frame sequence number of the any frame, and correspondingly change an end frame sequence number of the receive window corresponding to the target priority queue.

The terminal device may generate the multicast block acknowledgment (Multicast Block Ack, McBA) frame based on the received first multicast frame, and send the McBA frame to the access device, and/or when receiving a multicast block acknowledgment request (Multicast Block Ack Request, McBAR) frame sent by the access device, generate the McBA frame based on the received McBAR frame, and send the McBA frame to the access device. The McBAR frame includes an acknowledgment request field, and the acknowledgment request field is for requesting a status of receiving the at least one frame in the first multicast frame by the terminal device. The McBA frame includes the acknowledgment field, and the acknowledgment field indicates whether the terminal device receives the at least one frame included in the first multicast frame.

The first multicast frame is located in the target priority queue. Because the frame sequence number of the at least one frame included in the first multicast frame is within the frame sequence number range of the send window corresponding to the target priority queue, the acknowledgment request field may be for requesting a status of receiving a frame with each frame sequence number in the send window corresponding to the target priority queue.

For an updated receive window corresponding to the target priority queue, a frame sequence number of any frame in the at least one frame included in the first multicast frame is within a frame sequence number range of the receive window corresponding to the target priority queue or is less than a start frame sequence number of the receive window corresponding to the target priority queue. Therefore, the acknowledgment field may indicate a status of receiving a frame with each frame sequence number in the receive window corresponding to the target priority queue. The status of receiving the frame with each frame sequence number in the receive window corresponding to the target priority queue includes the status of receiving the at least one frame in the first multicast frame.

When the access device does not receive an McBA frame sent by any terminal device in the plurality of terminal devices, the access device may send an McBAR frame to the any terminal device. Optionally, after first duration after sending of the first multicast frame is completed, if the access device does not receive an McBA frame sent by any terminal device, the access device may send an McBAR frame to the any terminal device. Alternatively, after sending the first multicast frame, if the access device does not receive an McBA frame sent by any terminal device, the access device may send an McBAR frame to the any terminal device. A trigger condition for sending the McBAR frame by the access device is not limited in this embodiment of this application.

For the access device, a transmit channel of the first multicast frame is different from a transmit channel of the McBAR frame, and the transmit channel of the first multicast frame is different from a receive channel of the McBA frame. For example, a link is established between the access device and each terminal device through an actual channel, and then a virtual link may be established between the access device and each terminal device to obtain a virtual channel. The access device sends the first multicast frame and the McBAR frame through different virtual channels, and sends the first multicast frame and receives the McBA frame through different channels. It should be noted that a channel for generating the multicast frame, a channel for generating the McBAR frame, and a channel for actually processing the received McBA frame may be the same.

Optionally, a process of establishing the virtual link may include: The access device sends a MAC address request (MAR) frame to the terminal device on the actual channel, where the MAR frame is for requesting a MAC address of the virtual link of the terminal device. The terminal device sends a MAC address (MA) frame to the access device based on the received MAR frame, where the MA frame indicates the MAC address of the virtual link of the terminal device. The access device determines the MAC address of the virtual link of the terminal device based on the received MA frame, and performs authentication (AUTH) and association (ASSOC) procedure of the virtual link with the terminal device based on the MAC address. After being associated with the virtual link of the terminal device, the access device sends a virtual-link enable (VLE) frame to the terminal device on the actual channel, where the VLE frame indicates the terminal device to establish the virtual link. In this case, actual channels on the access device and the terminal device respectively load a pairwise transient key (PTK) and a group master key (GMK) of the actual channels on the virtual link, to establish the virtual link.

The MAR frame carries one byte, and the one byte indicates MAC address requests of different channels. For example, 0 may represent a MAC address request of a 2.4G channel, 1 may represent a MAC address request of a 5G channel, and 2 may represent a MAC address request of a 6G channel. The MA frame carries a 6-byte MAC address. The VLE frame carries 1-byte enabling information, 1 indicates enabling, and 0 indicates disabling.

For example, the virtual channel may include a 5 gigahertz (GHz, G) channel, a 2.4G channel, a $6^{th}$ generation mobile communication technology ($6^{th}$ generation mobile networks, 6G) channel, a channel on Bluetooth (BT), and a channel on hardware such as Bluetooth low energy (BLE). This is not limited in this embodiment of this application. A 2.4G channel is used as an example. The access device may generate a first multicast frame and an McBAR frame on a 5G channel, and then send the first multicast frame on the 5G channel, and send the McBAR frame on the 2.4G channel. Further, the access device may receive an McBA frame on the 2.4G channel, and process the received McBA frame on the 5G channel.

Correspondingly, for the terminal device, a receive channel of the first multicast frame is different from a receive channel of the McBAR frame, and the receive channel of the first multicast frame is different from a transmit channel of the McBA frame. A channel for generating the McBA frame, a channel for actually processing the received first multicast frame, and a channel for actually processing the received McBAR frame may be the same.

A 5G channel and a 2.4G channel are still used as an example. The terminal device may receive a first multicast frame and an McBAR frame on the 2.4G channel, and process the received first multicast frame and the received McBAR frame on the 5G channel. Further, the terminal device may generate an McBA frame on the 5G channel, and then send the McBA frame on the 2.4G channel.

In this embodiment of this application, quantities of times of sending the McBAR frame and the McBA frame are related to a quantity of terminal devices. When the quantity of terminal devices increases, air interface resources occupied by the McBAR frame and the McBA frame also increase. A transmit channel of the first multicast frame is different from a transmit channel of the McBAR frame, and the receive channel of the first multicast frame is different from the receive channel of the McBAR frame. This can avoid impact of the McBAR frame and the McBA frame on sending and receiving of the first multicast frame when there are a large quantity of terminal devices, so that a throughput rate of the first multicast frame is not affected by the McBAR frame and the McBA frame.

It should be noted that an existing Institute of Electrical and Electronics Engineers (IEEE) 802.11ax protocol does not include the McBAR frame and the McBA frame, and the two frames are re-created in this embodiment of this application. Optionally, a type of the McBAR frame or the McBA frame may be a management frame. The management frame may be created by using software, and a hardware structure of the access device or the terminal device does not need to be changed, thereby reducing complexity of creating the McBAR frame or the McBA frame.

The following separately describes structures of the McBAR frame and the McBA frame that are provided in this embodiment of this application. Refer to FIG. 3. FIG. 3 is a schematic diagram of a structure of an McBAR frame according to an embodiment of this application. The McBAR frame may be applicable to the IEEE 802.11ax protocol. As shown in FIG. 3, an acknowledgment request field included in the McBAR frame may be a start frame sequence number (SSN) field. The SSN field indicates a current start frame sequence number of a send window corresponding to a target priority queue.

The McBAR frame further includes multicast location information, and a terminal device may determine a first multicast frame from a plurality of received multicast frames based on the multicast location information. As shown in FIG. 3, the multicast location information may include a MAC address field of a transmit channel, a MAC address field of a receive channel, and a traffic identifier (TID) field. The MAC address field of the transmit channel indicates a MAC address of a channel that is in an access device and that is for generating the McBAR frame. The MAC address field of the receive channel indicates a MAC address of a channel that is in the terminal device and that is for processing the McBAR frame. The TID field indicates a priority of a multicast frame (that is, indicates the target priority queue), which includes four priorities: AC_BK, AC_BE, AC_VI, and AC_VO. For the TID field, refer to the foregoing descriptions. Details are not described in this embodiment of this application. The MAC address field of the receive channel is used by a sending device to send the McBAR frame.

It should be noted that the terminal device may receive multicast frames sent by a plurality of access devices, and multicast frames that are sent by a same access device and that are received by the terminal device also include multicast frames corresponding to different priority queues. The terminal device may determine, by using the MAC address field of the transmit channel, an access device corresponding to a frame whose receiving status needs to be obtained, determine, by using the TID field, a priority queue corresponding to the frame whose receiving status needs to be obtained, and determine, by using the SSN field, a frame sequence number of the frame whose receiving status needs to be obtained. Therefore, a multicast frame sent by an access device indicated by the MAC address field of the transmit channel is determined from the plurality of received multicast frames. Then, a multicast frame corresponding to the priority queue indicated by the TID field is determined from multicast frames sent by the access device indicated by the MAC address field of the transmit channel. In addition, a status of receiving a frame with a frame sequence number indicated by an SSN field in the multicast frame corresponding to the priority queue indicated by the TID field is obtained.

It is assumed that the access device generates an McBAR frame on a 5G channel and sends the McBAR frame on a 2.4G channel, and the terminal device receives the McBAR frame on a 2.4G channel and processes the McBAR frame on a 5G channel. In this case, the MAC address field of the transmit channel indicates a MAC address of the 5G channel of the access device, and the MAC address field of the receive channel indicates a MAC address of the 5G channel of the terminal device.

As shown in FIG. 3, the McBAR frame further includes: a frame control (frame control) field, a frame length (duration) field, a receiver address (RA) field, a transmitter address (TA) field, a multicast block acknowledgment request control (McBAR control) field, a multicast block acknowledgment request information (McBAR information) field, a frame check sequence (FCS) field, and the like. The frame control field and the frame length field belong to a frame header (MAC header). Functions of the foregoing fields are not described herein again.

Optionally, a subtype flag bit in the frame control field of the McBAR frame may be set to action no ack (Action no ack), so that a device (namely, the terminal device in this embodiment of this application) that receives the McBAR frame does not need to return an ACK when receiving the McBAR frame, thereby simplifying data transmission procedure. A subtype flag bit in a frame control field of an McBA frame may also be the Action no ack. This is not limited in this embodiment of this application.

Refer to FIG. 4. FIG. 4 is a schematic diagram of a structure of an McBA frame according to an embodiment of this application. The McBA frame may be applicable to an IEEE 802.11ax protocol. As shown in FIG. 4, an acknowledgment request field included in the McBA frame may include an SSN field, a bitmap length field, and a bitmap field. The SSN field indicates a current start frame sequence number of a receive window corresponding to a target priority queue. The bitmap length field indicates a length of the bitmap field. For example, when the bitmap length field is set to 0, it indicates that the length of the bitmap field is 32 bits; when the bitmap length field is set to 1, it indicates that the length of the bitmap field is 64 bits; when the bitmap length field is set to 2, it indicates that the length of the bitmap field is 128 bits; and when the bitmap length field is set to 3, it indicates that the length of the bitmap field is 256 bits. The bitmap field indicates a status of receiving a data frame with each frame sequence number in the receive window corresponding to the target priority queue. When any bit of the bitmap field is set to 1, it indicates that a data frame with a frame sequence number corresponding to the any bit is successfully received. When any bit of the bitmap field is set to 0, it indicates that a data frame with a frame sequence number corresponding to the any bit is not received.

The McBA frame further includes multicast location information. An access device may determine, based on the multicast location information, that an acknowledgment field in the McBA frame indicates a status of receiving a first multicast frame. As shown in FIG. 3, the multicast location information may include a MAC address field of a transmit channel, a MAC address field of a receive channel, and a TID field. For functions of the MAC address field of the transmit channel, the MAC address field of the receive channel, and the TID field, refer to FIG. 3. Details are not described in this embodiment of this application. For another field carried in the McBA frame in FIG. 4, refer to the McBAR frame. Details are not described in this embodiment of this application.

It should be noted that the access device may receive McBA frames sent by a plurality of terminal devices, and acknowledgment fields in McBA frames that are sent by a same terminal device and that are received by the access device also indicate statuses of receiving multicast frames corresponding to different priority queues. The access device may determine, by using the MAC address field of the transmit channel, a terminal device that sends the McBA frame, may determine, by using the TID field, a priority queue of a frame indicated by the acknowledgment field in the McBA frame, may determine, by using the SSN field, a frame sequence number of a frame indicated by the bitmap field, and may determine, by using the bitmap field, a status of receiving a frame with each frame sequence number. Therefore, based on a received McBA frame, a status of receiving, by the terminal device, a frame indicated by the McBA frame is determined.

The terminal device may further update a frame sequence number range of the receive window corresponding to the target priority queue based on a received McBAR frame. It can be learned from the foregoing description that the McBAR frame is for requesting a status of receiving a data frame with each frame sequence number in a send window corresponding to the target priority queue. This indicates that the access device does not need to determine a status of receiving a frame before a start frame sequence number of the send window corresponding to the target priority queue. Therefore, the terminal device may update the frame sequence number range of the receive window corresponding to the target priority queue based on the McBAR frame. For example, the terminal device may update the start frame sequence number of the receive window corresponding to the target priority queue to a value of an SSN field carried in the McBAR frame.

The process is described by using one terminal device as an example. Each terminal device (for example, the terminal device b1 or the terminal device b2) needs to perform the foregoing process. Details are not described in this embodiment of this application.

103: The access device determines, based on acknowledgment fields included in received multicast block acknowledgment frames respectively sent by the plurality of terminal devices, whether any terminal device in the plurality of terminal devices receives a target frame in the first multicast frame.

A frame before a value of an SSN field in an McBA frame sent by any terminal device has already been received by the any terminal device. The access device may determine, based on an SSN field and a bitmap field of the received McBA frame sent by each terminal device, a frame that is in the first multicast frame and that is received by the terminal device and a frame that is in the first multicast frame and that is not received, to determine whether any terminal device in the plurality of terminal devices does not receive the target frame in the first multicast frame.

104: The access device resends the target frame to the plurality of terminal devices when determining that the any terminal device does not receive the target frame in the first multicast frame.

The access device may repeatedly perform a retransmission process until a retransmission end condition is satisfied. The retransmission process includes: sending the target frame to the plurality of terminal devices, receiving an McBA frame sent by each terminal device, and determining, based on the McBA frame, whether each terminal device receives the target frame. The retransmission end condition includes at least one of the following: a quantity of times of repeated sending is greater than a quantity-of-times threshold and the terminal device still does not receive the target frame, the plurality of terminal devices each receive the target frame, and duration of the retransmission process is greater than a duration threshold.

When the quantity of times of repeated sending by the access device is greater than the quantity-of-times threshold and the terminal device still does not receive the target frame, or the duration of the retransmission process is greater than the duration threshold, the access device ends the retransmission process. In this case, the access device discards the target frame. Further, the access device may update the frame sequence number range of the send window corresponding to the target priority queue. For example, the access device may update the start frame sequence number of the send window corresponding to the target priority queue to a value obtained by adding one to a maximum frame sequence number in the first multicast frame currently received by all terminal devices and the discarded target frame.

When the access device aggregates the plurality of frames to obtain the first multicast frame, in each retransmission process, the access device may aggregate the target frame and at least one current to-be-transmitted multicast frame to obtain a second multicast frame, and then send the second multicast frame to the plurality of terminal devices. A frame sequence number of the at least one to-be-transmitted multicast frame is within the frame sequence number range of the send window corresponding to the target priority queue, and the to-be-transmitted multicast frame includes an unsent frame and/or the target frame in a multicast frame sent after the first multicast frame. The process may be performed after the access device completes sending the first multicast frame currently being sent, or may be performed after the access device sends, to the plurality of terminal devices, a frame with an end frame sequence number of the send window corresponding to the target priority queue. A performing moment of the process is not limited in this embodiment of this application.

Each time when receiving the McBA frame sent by each terminal device, the access device may update the send window corresponding to the target priority queue based on the McBA frame. A minimum frame sequence number of the at least one frame included in the first multicast frame is the start frame sequence number of the send window corresponding to the target priority queue. For example, the access device determines, based on the McBA frame sent by each terminal device, a non-target frame that is in the first multicast frame and that is received by each of the terminal devices. The frame sequence number range is updated when a frame with the minimum frame sequence number in the at least one frame is a non-target frame. For example, when the access device determines that the frame with the start frame sequence number of the send window corresponding to the target priority queue in the first multicast frame is a non-target frame, the access device increases the start frame sequence number of the send window corresponding to the target priority queue by one, increases the end frame sequence number by one, and so on, until the frame with the current start frame sequence number of the send window corresponding to the target priority queue in the first multicast frame is the target frame.

Optionally, the access device may further determine signal strength of each terminal device based on the received McBA frame. Then, at least one of the following parameters is adjusted based on the signal strength of the terminal device: a physical layer rate for sending a multicast frame, the aggregation quantity, and a bandwidth for sending a multicast frame.

Each time after the access device determines the target frame, when a minimum frame sequence number in the target frame is greater than the start frame sequence number of the send window corresponding to the target priority queue, the access device updates the frame sequence number range. For example, the access device may update the start frame sequence number of the send window corresponding to the target priority queue to the minimum frame sequence number in the target frame.

In the process 104, as shown in FIG. 2, the access device may resend the target frame to the terminal device b1 and the terminal device b2.

Figure 5:
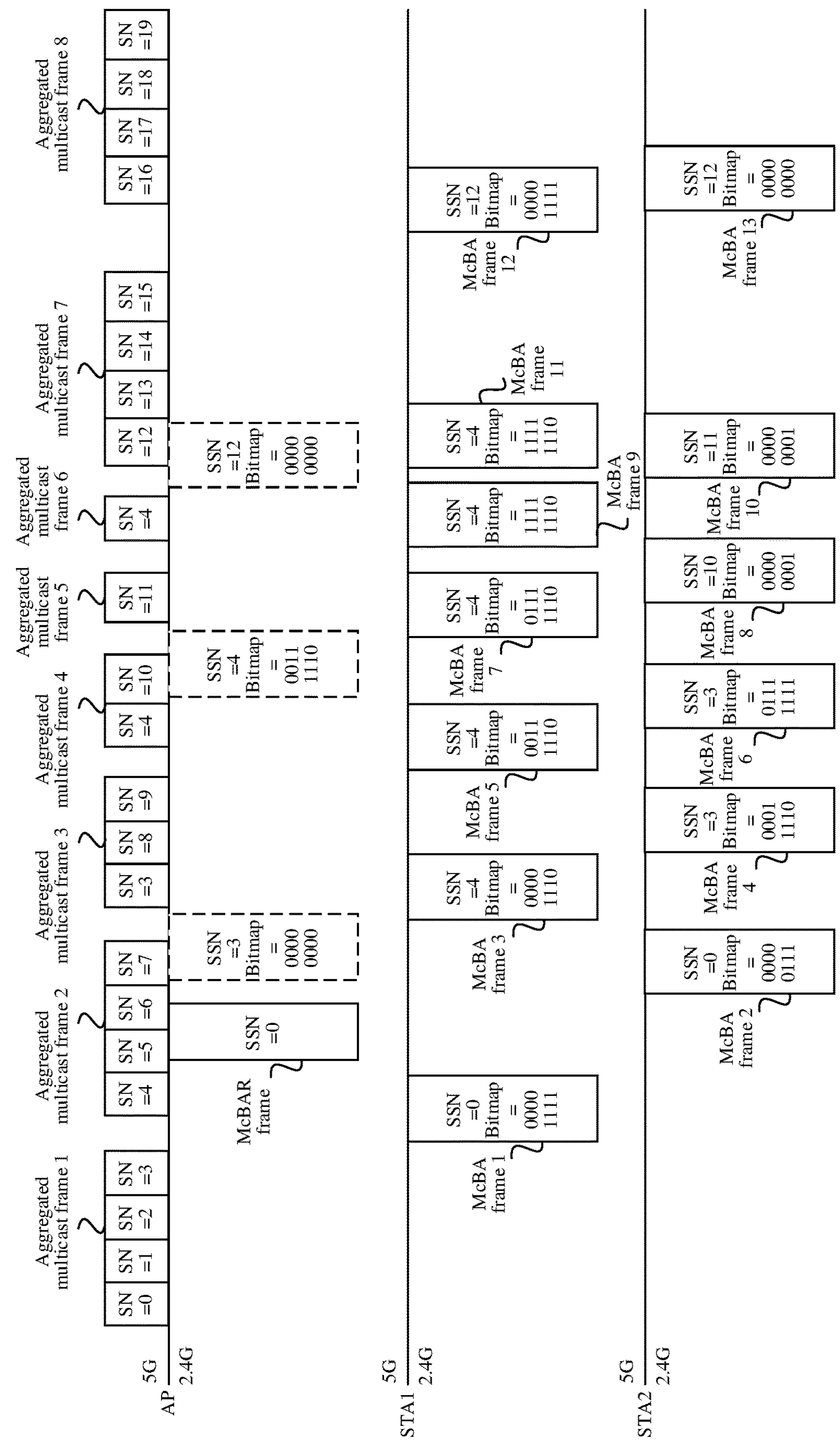
FIG. 5 is a schematic diagram of a data transmission process according to an embodiment of this application.

To facilitate understanding of the foregoing process, an embodiment of this application uses FIG. 5 as an example to describe the foregoing data transmission process. Refer to FIG. 5. FIG. 5 is a schematic diagram of a data transmission process according to an embodiment of this application. FIG. 5 shows an AP, an STA 1, and an STA 2. In FIG. 5, it is assumed that the AP sends, on a 5G channel, an aggregated multicast frame located in a target priority queue, and sends an McBAR frame and receives an McBA frame on a 2.4G channel, the STA 1 and the STA 2 both receive the McBAR frame and send the McBA frame on a 2.4G channel, and receive the multicast frame on a 5G channel, and sizes of a send window and a receive window that correspond to the target priority queue are both 8. A dashed-line box in FIG. 5 represents a start frame sequence number and a frame sequence number range that are of the send window corresponding to the target priority queue.

In addition, FIG. 5 is described by using an example in which the STA 1 and the STA 2 each send an McBA frame to the AP each time when receiving an aggregated multicast frame or an McBAR frame; when not receiving an McBA frame sent by any STA within a period of time after completing sending an aggregated multicast frame, the AP sends an McBAR frame to the any STA; after determining a to-be-retransmitted multicast frame, the AP starts to send the to-be-retransmitted multicast frame after completing sending a current aggregated multicast frame; and a retransmission end condition is that duration of a retransmission process is greater than a duration threshold.

As shown in FIG. 5, a frame sequence number range of a send window corresponding to an initial target priority queue is 0 to 7. The AP sends, to the STA 1 and the STA 2, an aggregated multicast frame 1 including frame sequence numbers 0 to 3. The STA 1 sends an McBA frame 1 to the AP based on the aggregated multicast frame 1. A bitmap field of the McBA frame 1 is "00001111", indicating that the STA 1 receives each multicast frame in the aggregated multicast frame 1. The STA 1 updates a start frame sequence number of a receive window corresponding to the target priority queue to 4, and correspondingly, a frame sequence number range is updated to 4 to 11. The STA 2 does not send an McBA frame to the AP.

The AP sends, to the STA 1 and the STA 2, an aggregated multicast frame 2 including frame sequence numbers 4 to 7. In a process of sending the aggregated multicast frame 2, the AP sends an McBAR frame to the STA 2 that does not send the McBA frame, where an SSN field of the McBAR frame is 0, to request a status of receiving, by the STA 2, multicast frames with a frame sequence number 0 and a subsequent frame sequence number. The STA 2 sends an McBA frame 2 to the AP based on the McBAR frame. A bitmap field of the McBA frame 2 is "00000111", indicating that the STA 1 receives multicast frames 0 to 2 in the aggregated multicast frame 1 but does not receive a multicast frame 3. The STA 2 updates a start frame sequence number of a receive window corresponding to the target priority queue to 3, and correspondingly, a frame sequence number range of the receive window corresponding to the target priority queue is updated to 3 to 10. The AP determines, based on the received McBA frame 1 and the received McBA frame 2, that the multicast frames 1 and 2 are both received by the STA 1 and the STA 2. Therefore, the AP updates the start frame sequence number of the send window corresponding to the target priority queue to 3, and correspondingly, the frame sequence number range is updated to 3 to 10. In this case, a status of receiving multicast frames in the frame sequence number range is represented as "00000000", where 0 indicates that a multicast frame with the frame sequence number is not received by both the STA 1 and the STA 2, and 1 indicates that the multicast frame with the frame sequence number is received by both the STA 1 and the STA 2.

After completing sending the aggregated multicast frame 2, the AP determines that a to-be-retransmitted multicast frame is the multicast frame 3, and the AP sends an aggregated multicast frame 3 including frame sequence numbers 3, 8, and 9 to the STA 1 and the STA 2. In a process that the aggregated multicast frame 3 is sent, the STA 1 sends an McBA frame 3 to the AP based on the aggregated multicast frame 2. A bitmap field of the McBA frame 3 is "00001110". In this case, the start frame sequence number of the receive window corresponding to the target priority queue is 4, indicating that the STA 1 receives multicast frames 5 to 7 but does not receive a multicast frame 4. The STA 1 does not update the receive window corresponding to the target priority queue. The STA 2 sends an McBA frame 4 to the AP based on the aggregated multicast frame 2. A bitmap field of the McBA frame 4 is "00011110". In this case, the start frame sequence number of the receive window corresponding to the target priority queue is 3, indicating that the STA 1 receives multicast frames 4 to 7 but does not receive the multicast frame 3. The STA 2 does not update the receive window corresponding to the target priority queue.

After completing sending the aggregated multicast frame 3, the AP determines that a to-be-retransmitted multicast frame is the multicast frame 4, and the AP sends an aggregated multicast frame 4 including frame sequence numbers 4 and 10 to the STA 1 and the STA 2. In a process that the aggregated multicast frame 4 is sent, the STA 1 sends an McBA frame 5 to the AP based on the aggregated multicast frame 3. A bitmap field of the McBA frame 5 is "00111110". In this case, the start frame sequence number of the receive window corresponding to the target priority queue is 4, indicating that the STA 1 receives multicast frames 5 to 9 but does not receive the multicast frame 4. The STA 1 does not update the receive window corresponding to the target priority queue. The STA 2 sends an McBA frame 6 to the AP based on the aggregated multicast frame 3. A bitmap field of the McBA frame 6 is "01111111". In this case, the start frame sequence number of the receive window corresponding to the target priority queue is 3, indicating that the STA 2 receives multicast frames 3 to 9. The STA 2 updates the start frame sequence number of the receive window corresponding to the target priority queue to 10, and correspondingly, the frame sequence number range is updated to 10 to 17. The AP determines, based on the received McBA frame 5 and the received McBA frame 6, that the multicast frame 3 is received by both the STA 1 and the STA 2. Therefore, the AP updates the start frame sequence number of the send window corresponding to the target priority queue to 4, and correspondingly, the frame sequence number range is updated to 4 to 11. In this case, the status of receiving multicast frames in the frame sequence number range is represented as "00111110".

After completing sending the aggregated multicast frame 4, the AP sends an aggregated multicast frame 5 including a frame sequence number 11 to the STA 1 and the STA 2. In a process that the aggregated multicast frame 5 is sent, the STA 1 sends an McBA frame 7 to the AP based on the aggregated multicast frame 4. A bitmap field of the McBA frame 7 is "01111110". In this case, the start frame sequence number of the receive window corresponding to the target priority queue is 4, indicating that the STA 1 receives multicast frames 5 to 10 but does not receive the multicast frame 4. The STA 1 does not update the receive window corresponding to the target priority queue. The STA 2 sends an McBA frame 8 to the AP based on the aggregated multicast frame 4. A bitmap field of the McBA frame 8 is "00000001". In this case, the start frame sequence number of the receive window corresponding to the target priority queue is 10, indicating that the STA 2 receives a multicast frame 10. The STA 2 updates the start frame sequence number of the receive window corresponding to the target priority queue to 11, and correspondingly, the frame sequence number range is updated to 11 to 18. The AP determines, based on the received McBA frame 7 and the received McBA frame 8, that the multicast frame 4 is still not received by the STA 1.

After completing sending the aggregated multicast frame 5, the AP resends an aggregated multicast frame 6 including the frame sequence number 4 to the STA 1 and the STA 2. In a process that the aggregated multicast frame 6 is sent, the STA 1 sends an McBA frame 9 to the AP based on the aggregated multicast frame 5. A bitmap field of the McBA frame 9 is "11111110". In this case, the start frame sequence number of the receive window corresponding to the target priority queue is 4, indicating that the STA 1 receives multicast frames 5 to 11 but does not receive the multicast frame 4. The STA 1 does not update the receive window corresponding to the target priority queue. The STA 2 sends an McBA frame 10 to the AP based on the aggregated multicast frame 5. A bitmap field of the McBA frame 10 is "00000001". In this case, the start frame sequence number of the receive window corresponding to the target priority queue is 11, indicating that the STA 2 receives a multicast frame 11. The STA 2 updates the start frame sequence number of the receive window corresponding to the target priority queue to 12, and correspondingly, the frame sequence number range is updated to 12 to 19. The AP determines, based on the received McBA frame 9 and the received McBA frame 10, that the multicast frame 4 is still not received by the STA 1.

After sending of the aggregated multicast frame 6 is completed, the STA 1 sends the McBA frame 9 to the AP based on the aggregated multicast frame 5. A bitmap field of the McBA frame 11 is "11111110". In this case, the start frame sequence number of the receive window corresponding to the target priority queue is 4, indicating that the STA 1 receives multicast frames 5 to 11 but does not receive the multicast frame 4. The STA 1 does not update the receive window corresponding to the target priority queue. The AP determines, based on the received McBA frame 11, that the multicast frame 4 is still not received by the STA 1. In this case, retransmission duration of the multicast frame 4 is already greater than the duration threshold, and the AP may forcibly update the frame sequence number range of the send window corresponding to the target priority queue. The AP may update the start frame sequence number of the send window corresponding to the target priority queue to 12, and correspondingly, the frame sequence number range is updated to 12 to 19. In this case, the status of receiving multicast frames in the frame sequence number range is represented as "00000000".

Then, the AP sends an aggregated multicast frame 7 including frame sequence numbers 12 to 15 to the STA 1 and the STA 2. After sending of the aggregated multicast frame 6 is completed, the STA 1 forcibly updates the frame sequence number range of the receive window corresponding to the target priority queue based on the aggregated multicast frame 7. The STA 1 may update the start frame sequence number of the send window corresponding to the target priority queue to 12, and correspondingly, the frame sequence number range is updated to 12 to 19. The STA 1 sends an McBA frame 12 to the AP. A bitmap field of the McBA frame 12 is "00001111", indicating that the STA 1 receives multicast frames 12 to 15. The STA 2 sends an McBA frame 13 to the AP based on the aggregated multicast frame 7. A bitmap field of the McBA frame 13 is "00000000". In this case, the start frame sequence number of the receive window corresponding to the target priority queue is 12, indicating that the STA 2 does not receive the multicast frames 12 to 15. In a process of receiving the McBA frame 12 and the McBA frame 13, the AP sends an aggregated multicast frame 8 including frame sequence numbers 16 to 19 to the STA 1 and the STA 2. Subsequent processes are deduced by analogy. Details are not described herein in this embodiment of this application.

The data transmission process shown in FIG. 5 is merely an example for description, and is not limited thereto. For example, an actual size of the send window or the receive window corresponding to the target priority queue may be 64, 128, 256, or the like.

It should be noted that, in a conventional technology, a terminal device does not send an acknowledgment response when receiving a multicast frame, and reliability is low. If the multicast frame is sent at a high rate, reliability is further reduced. However, in this embodiment of this application, a terminal device may send an McBA frame indicating a status of receiving a multicast frame by the terminal device to an access device, so that reliability of multicast frame transmission can be ensured. Therefore, the access device in this embodiment of this application may send a plurality of multicast frames at a high-throughput (HT) rate, a very-high throughput (VHT) rate, or a high-efficiency (HE) rate. This ensures reliability of multicast frame transmission while improving a throughput rate of a data transmission system during data transmission.

In conclusion, according to the data transmission method in this embodiment of this application, after an access device sends a first multicast frame to a plurality of terminal devices, the terminal device may send an McBA frame to the access device. The McBA frame includes an acknowledgment field, and the acknowledgment field indicates whether the terminal device receives at least one frame included in the first multicast frame. When determining, based on the McBA frame sent by any terminal device in the plurality of terminal devices, that the any terminal device does not receive a target frame in the first multicast frame, the access device resends the target frame to the plurality of terminal devices, so that only a frame that is not received by the terminal device needs to be resent, and a frame that has been received by the terminal device does not need to be sent for a plurality of times. This ensures multicast frame transmission reliability and improves multicast frame transmission efficiency.

Further, when the access device does not receive an McBA frame sent by any terminal device, the access device may send an McBAR frame to the any terminal device, to receive an McBA frame sent by the any terminal device based on the McBAR frame, thereby further improving data transmission reliability.

In addition, the access device may aggregate a plurality of frames to obtain at least one aggregated frame, and the at least one aggregated frame forms the first multicast frame. The plurality of frames are aggregated, and only one PLCP-Header and one PLCPPreamble need to be added to the plurality of frames, thereby reducing quantities of PLCP-Headers and PLCPPreambles that are required for sending the first multicast frame, and improving a throughput rate of a data transmission system during multicast frame transmission.

In addition, in the access device, a transmit channel of the first multicast frame is different from a transmit channel of the McBAR frame; and in the terminal device, a receive channel of the first multicast frame is different from a receive channel of the McBAR frame. This can avoid impact of the McBAR frame and the McBA frame on sending and receiving of the multicast frame when there are a large quantity of terminal devices, so that a throughput rate of the multicast frame is not affected by the McBAR frame and the McBA frame.

Embodiments of this application may be applied to a Wi-Fi wireless screen mirroring application. In the Wi-Fi wireless screen mirroring application, content on a device needs to be synchronously sent to a plurality of terminal devices. For example, a teacher synchronously displays content that is on a device of the teacher on a device of each classmate, or an employee synchronously displays content that is on a device of the employee on a device of another employee. In embodiments of this application, data transmission reliability and a throughput rate in a process of using the Wi-Fi wireless screen mirroring application can be improved, thereby optimizing performance of the Wi-Fi wireless screen mirroring application.

An order of the methods provided in embodiments of this application may be properly adjusted, and a process may be correspondingly added or deleted based on a situation. Any variation method that can be easily figured out by a person skilled in the art within the technical scope disclosed in this application shall fall within the protection scope of this application. This is not limited in embodiments of this application.

The foregoing mainly describes the data transmission method provided in embodiments of this application from a perspective of interaction between devices. It may be understood that to implement the foregoing functions, the devices include hardware structures and/or software modules corresponding to the functions. A person of ordinary skill in the art should easily be aware that, in combination with algorithms and steps in the examples described in embodiments disclosed in this specification, this application can be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

In embodiments of this application, the electronic device may be divided into functional modules based on the foregoing method examples. For example, each functional module corresponding to each function may be obtained through division, or two or more functions may be integrated into one processing module. The integrated module may be implemented in a form of hardware, or may be implemented in a form of a software functional module. It should be noted that, in embodiments of this application, module division is an example, and is merely a logical function division. In actual implementation, another division manner may be used.

Figure 6:
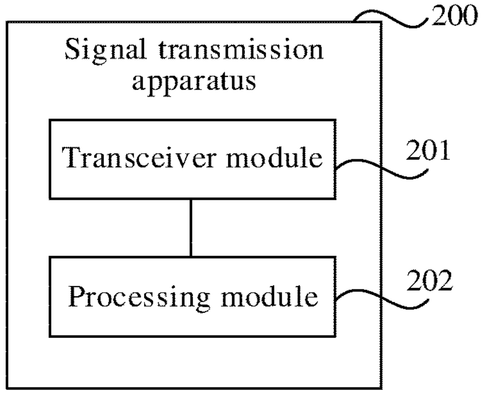
FIG. 6 is a block diagram of a data transmission apparatus according to an embodiment of this application.

FIG. 6 is a block diagram of a data transmission apparatus according to an embodiment of this application. When each function module is obtained through division based on each corresponding function, a data transmission apparatus 200 may include a transceiver module 201 and a processing module 202. For example, the data transmission apparatus may be an access device or a terminal device, or may be a chip or another combined device or component that has a function of the data transmission apparatus, or the like in an access device or a terminal device. When the data transmission apparatus is an access device or a terminal device, the transceiver module 201 may be a transceiver, where the transceiver may include an antenna, a radio frequency circuit, and the like; and the processing module 202 may be a processor (or a processing circuit), for example, a baseband processor, where the baseband processor may include one or more central processing units (CPUs). When the data transmission apparatus is a device or component that has the foregoing function, the transceiver module 201 may be a radio frequency unit; and the processing module 202 may be a processor (or a processing circuit), for example, a baseband processor. When the data transmission apparatus 200 is a chip system, the transceiver module 201 may be an input/output interface of a chip (for example, a baseband chip); and the processing module 202 may be a processor (or a processing circuit) of the chip system and may include one or more central processing units. It should be understood that the transceiver module 201 in this embodiment of this application may be implemented by a transceiver or a transceiver-related circuit component; and the processing module 202 may be implemented by a processor or a processor-related circuit component (or referred to as a processing circuit).

For example, when the data transmission apparatus 200 is an access device or a chip or a functional unit of an access device, the transceiver module 201 may be configured to perform all receiving and sending operations performed by the access device in the embodiment shown in FIG. 2, and/or be configured to support another process of the technology described in this specification; and the processing module 202 may be configured to perform all operations other than the receiving and sending operations performed by the access device in the embodiment shown in FIG. 2, and/or be configured to support another process of the technology described in this specification.

The transceiver module 201 may include a sending module and/or a receiving module, respectively configured to perform the sending and receiving operations performed by the access device in the embodiment shown in FIG. 2. In an example, the data transmission apparatus includes a transceiver module and a processing module. The transceiver module is configured to send a first multicast frame to a plurality of terminal devices, and receive multicast block acknowledgment frames respectively sent by the plurality of terminal devices, where the multicast block acknowledgment frame sent by the terminal device includes an acknowledgment field, and the acknowledgment field indicates whether the terminal device receives at least one frame included in the first multicast frame. The processing module is configured to determine, based on the acknowledgment field included in the multicast block acknowledgment frame sent by any terminal device in the plurality of terminal devices, that the any terminal device does not receive a target frame in the first multicast frame. Based on the determining, the transceiver is configured to resend the target frame to the plurality of terminal devices.

With reference to the foregoing solution, the first multicast frame includes a plurality of frames, and the transceiver module is further configured to obtain the plurality of frames. The data transmission apparatus further includes a processing module, configured to aggregate the plurality of frames to obtain at least one aggregated frame, where the at least one aggregated frame forms the first multicast frame. The transceiver module is specifically configured to sequentially send the at least one aggregated frame to the plurality of terminal devices.

With reference to the foregoing solution, the transceiver module is further configured to: when the multicast block acknowledgment frame sent by the any terminal device is not received, send a multicast block acknowledgment request frame to the any terminal device, where the multicast block acknowledgment request frame includes an acknowledgment request field, and the acknowledgment request field is for requesting a status of receiving the at least one frame by the any terminal device. The transceiver module is specifically configured to receive a multicast block acknowledgment frame sent by the any terminal device based on the acknowledgment request field included in the multicast block acknowledgment request frame.

With reference to the foregoing solution, the first multicast frame is located in a target priority queue, the at least one frame each has a frame sequence number, and the frame sequence number of the at least one frame is in a frame sequence number range of a send window corresponding to the target priority queue. A value of the acknowledgment request field is a current start frame sequence number of the send window corresponding to the target priority queue, and the acknowledgment request field is for requesting a status of receiving, by the any terminal device, a frame with each frame sequence number in the send window corresponding to the target priority queue.

With reference to the foregoing solution, the multicast block acknowledgment request frame further includes multicast location information, and the terminal device is configured to determine the first multicast frame from a plurality of received multicast frames based on the multicast location information.

With reference to the foregoing solution, the multicast location information includes a media access control MAC address field of a transmit channel, a MAC address field of a receive channel, and a traffic identifier TID field. The MAC address field of the transmit channel indicates a MAC address of a channel that is in the access device and that is for generating the multicast block acknowledgment request frame, the MAC address field of the receive channel indicates a MAC address of a channel that is in the terminal device and that is for processing the multicast block acknowledgment request frame, and the TID field indicates the target priority queue.

With reference to the foregoing solution, a transmit channel of the first multicast frame is different from a transmit channel of the multicast block acknowledgment request frame, and the transmit channel of the first multicast frame is different from a receive channel of the multicast block acknowledgment frame.

With reference to the foregoing solution, the transceiver module is specifically configured to repeatedly perform a retransmission process until a retransmission end condition is satisfied. The retransmission process includes: sending the target frame to the plurality of terminal devices; receiving the multicast block acknowledgment frames sent by the plurality of terminal devices; and determining, based on the multicast block acknowledgment frames, whether the plurality of terminal devices each receive the target frame. The retransmission end condition includes at least one of the following: a quantity of times of repeated sending is greater than a quantity-of-times threshold the terminal device still does not receive the target frame, the plurality of terminal devices each receive the target frame, and duration of the retransmission process is greater than a duration threshold.

With reference to the foregoing solution, the first multicast frame is located in the target priority queue, the at least one frame each has a frame sequence number, and the frame sequence number of the at least one frame is within the frame sequence number range of the send window corresponding to the target priority queue. The transceiver module is specifically configured to aggregate the target frame and at least one current to-be-transmitted frame to obtain a second multicast frame, where a frame sequence number of the at least one to-be-transmitted frame is within the frame sequence number range of the send window corresponding to the target priority queue; and send the second multicast frame to the plurality of terminal devices.

With reference to the foregoing solution, the first multicast frame is located in the target priority queue, the at least one frame each has a frame sequence number, the frame sequence number of the at least one frame is within the frame sequence number range of the send window corresponding to the target priority queue, a minimum frame sequence number of the at least one frame is a start frame sequence number of the send window corresponding to the target priority queue, and the processing module is further configured to update the frame sequence number range when a frame with the minimum frame sequence number in the at least one frame is a non-target frame.

For example, when the data transmission apparatus 200 is a terminal device or a chip or a functional unit of a terminal device, the transceiver module 201 may be configured to perform all receiving and sending operations performed by the terminal device in the embodiment shown in FIG. 2, and/or be configured to support another process of the technology described in this specification; and the processing module 202 may be configured to perform all operations other than the receiving and sending operations performed by the terminal device in the embodiment shown in FIG. 2, and/or be configured to support another process of the technology described in this specification.

The transceiver module 201 may include a sending module and/or a receiving module, respectively configured to perform the sending and receiving operations performed by the terminal device in the embodiment shown in FIG. 2. In an example, the data transmission apparatus includes:

a transceiver module, configured to receive at least one first multicast frame sent by a sending access device, where the at least one first multicast frame is located in a target priority queue, each of the at least one first multicast frame has a frame sequence number, and the at least one frame sequence number is within a frame sequence number range of a receive window corresponding to the target priority queue.

The transceiver module is further configured to send a multicast block acknowledgment frame to the access device, where the multicast block acknowledgment frame includes an acknowledgment field, the acknowledgment field indicates whether at least one frame included in the first multicast frame is received, and when determining, based on the acknowledgment field included in the multicast block acknowledgment frame, that a target frame in the first multicast frame is not received, the access device is configured to resend the target frame.

With reference to the foregoing solution, the at least one frame forms at least one aggregated frame.

With reference to the foregoing solution, the first multicast frame is located in the target priority queue, the at least one frame each has a frame sequence number, and a frame sequence number of any frame in the at least one frame is within the frame sequence number range of the receive window corresponding to the target priority queue or is less than a start frame sequence number of the receive window corresponding to the target priority queue; and the acknowledgment field indicates a status of receiving a frame with each frame sequence number in the receive window corresponding to the target priority queue.

With reference to the foregoing solution, the multicast block acknowledgment frame further includes multicast location information, and the access device is configured to determine, based on the multicast location information, that the acknowledgment field indicates a status of receiving the first multicast frame.

With reference to the foregoing solution, the multicast location information includes a media access control MAC address field of a transmit channel, a MAC address field of a receive channel, and a traffic identifier TID field. The MAC address field of the transmit channel indicates a MAC address of a channel that is in the terminal device and that is for generating the multicast block acknowledgment frame, the MAC address field of the receive channel indicates a MAC address of a channel that is in the access device and that is for processing the multicast block acknowledgment frame, and the TID field indicates the target priority queue.

With reference to the foregoing solution, the transceiver module is specifically configured to: receive a multicast block acknowledgment request frame sent by the access device, where the multicast block acknowledgment request frame includes an acknowledgment request field, and the acknowledgment request field is for requesting a status of receiving the at least one frame; and send the multicast block acknowledgment frame to the access device based on the acknowledgment request field included in the multicast block acknowledgment request frame.

With reference to the foregoing solution, a receive channel of the first multicast frame is different from a receive channel of the multicast block acknowledgment request frame, and the receive channel of the first multicast frame is different from a transmit channel of the multicast block acknowledgment frame.

With reference to the foregoing solution, the data transmission apparatus further includes a processing module, configured to update the frame sequence number range of the receive window corresponding to the target priority queue based on the multicast block acknowledgment request frame.

With reference to the foregoing solution, the processing module is further configured to update the frame sequence number range of the receive window corresponding to the target priority queue based on the received first multicast frame.

Figure 7:
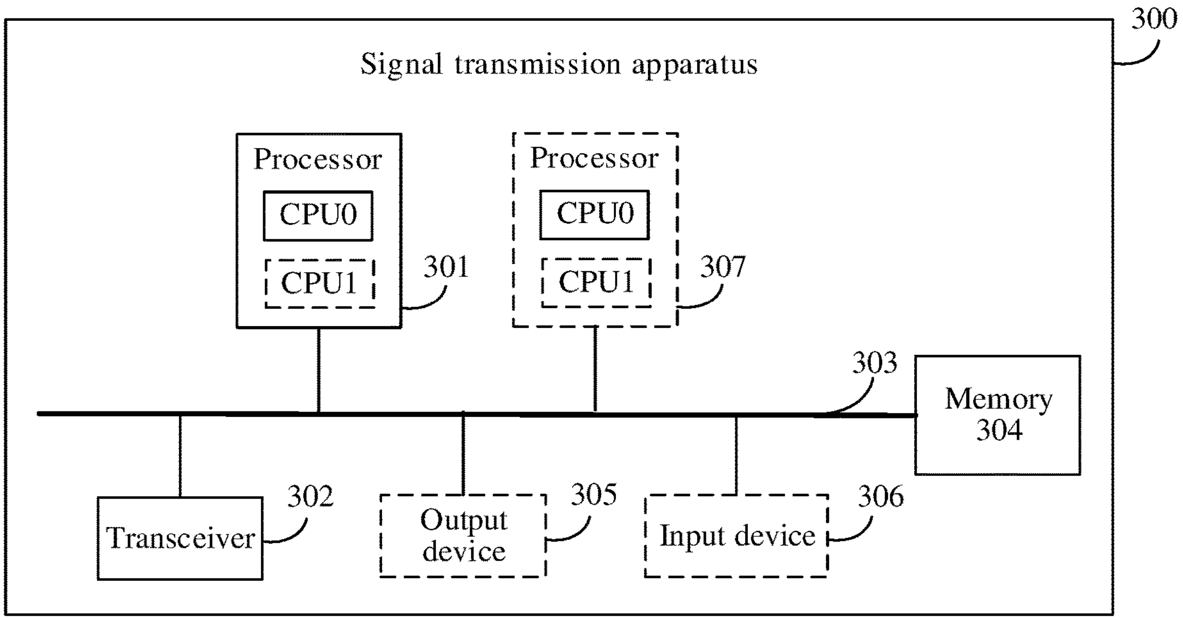
FIG. 7 is a schematic diagram of a structure of an electronic device according to an embodiment of this application.

FIG. 7 is a schematic diagram of a structure of an electronic device according to an embodiment of this application. The electronic device 300 may be an access device or a chip or a function module in an access device; or may be a terminal device or a chip or a function module in a terminal device. As shown in FIG. 7, the electronic device 300 includes a processor 301, a transceiver 302, and a communication line 303.

The processor 301 is configured to perform any step performed by the access device or the terminal device in the method embodiment shown in FIG. 2, and when performing data transmission such as obtaining, may choose to invoke the transceiver 302 and the communication line 303 to complete a corresponding operation.

Further, the electronic device 300 may further include a memory 304. The processor 301, the memory 304, and the transceiver 302 may be connected through the communication line 303.

The processor 301 is a CPU, a general-purpose processor, a network processor (NP), a digital signal processor (DSP), a microprocessor, a microcontroller, a programmable logic device (PLD), or any combination thereof. Alternatively, the processor 301 may be another apparatus having a processing function, for example, a circuit, a component, or a software module. This is not limited.

The transceiver 302 is configured to communicate with another device or another communication network. The another communication network may be an Ethernet, a radio access network (RAN), a wireless local area network (WLAN), or the like. The transceiver 302 may be a module, a circuit, a transceiver, or any apparatus that can implement communication.

The transceiver 302 is mainly configured to receive and send data, and may include a transmitter and a receiver, which respectively send and receive data. Operations other than data receiving and sending are implemented by the processor, for example, information processing and calculation.

The communication line 303 is configured to transmit information between components included in the electronic device 300.

In a design, the processor may be considered as a logic circuit, and the transceiver may be considered as an interface circuit.

The memory 304 is configured to store instructions. The instruction may be a computer program.

The memory 304 may be a volatile memory or a non-volatile memory, or may include both a volatile memory and a non-volatile memory. The non-volatile memory may be a read-only memory (ROM), a programmable read-only memory (programmable ROM, PROM), an erasable programmable read-only memory (erasable PROM, EPROM), an electrically erasable programmable read-only memory (electrically EPROM, EEPROM), or a flash memory. The volatile memory may be a random access memory (RAM), used as an external cache. Through example but not limitative description, many forms of RAMs may be used, for example, a static random access memory (static RAM, SRAM), a dynamic random access memory (dynamic RAM, DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchlink dynamic random access memory (synchlink DRAM, SLDRAM), and a direct rambus random access memory (direct rambus RAM, DR RAM). The memory 304 may further be a compact disc read-only memory (CD-ROM) or another compact disc storage, optical disc storage (including a compressed optical disc, a laser disc, an optical disc, a digital versatile optical disc, a Blu-ray disc, or the like), a magnetic disk storage medium, another magnetic storage device, or the like. It should be noted that the memories of the systems and methods described in this specification are intended to include, but are not limited to, these and any other suitable types of memories.

It should be noted that the memory 304 may exist independently of the processor 301, or may be integrated with the processor 301. The memory 304 may be configured to store instructions, program code, some data, or the like. The memory 304 may be located inside the electronic device 300, or may be located outside the electronic device 300. This is not limited. The processor 301 is configured to execute the instructions stored in the memory 304, to implement methods provided in the following embodiments of this application.

In an example, the processor 301 may include one or more CPUs, for example, a CPU 0 and a CPU 1 in FIG. 7.

In an optional implementation, the electronic device 300 includes a plurality of processors. For example, in addition to the processor 301 in FIG. 7, the electronic device may further include a processor 307.

In an optional implementation, the electronic device 300 further includes an output device 305 and an input device 306. For example, the input device 306 is a device such as a keyboard, a mouse, a microphone, or a joystick, and the output device 305 is a device such as a display or a speaker.

It should be noted that the electronic device 300 may be a terminal device, a network device, a relay device, an embedded device, a chip system, or a device having a structure similar to that in FIG. 7. In addition, the composition structure shown in FIG. 7 does not constitute a limitation on the electronic device 300. In addition to the components shown in FIG. 7, the electronic device 300 may include more or fewer components than those shown in FIG. 7, or combine some components, or have different component deployments.

The processor and the transceiver that are described in this application may be implemented on an integrated circuit (IC), an analog IC, a radio frequency integrated circuit, a hybrid signal IC, an application-specific integrated circuit (ASIC), a printed circuit board (PCB), an electronic device, or the like. The processor and the transceiver each may be manufactured by using various IC processing technologies, for example, a complementary metal oxide semiconductor (CMOS), an n-type metal-oxide-semiconductor (n Metal-oxide-semiconductor, NMOS), a p-type metal oxide semiconductor (positive channel metal oxide semiconductor, PMOS), a bipolar junction transistor (BJT), a bipolar CMOS (BiCMOS), silicon germanium (SiGe), and gallium arsenide (GaAs).

It should be noted that the electronic device 300 may be any type of handheld device or fixed device, for example, a notebook computer or a laptop computer, a mobile phone, a smartphone, a tablet or a tablet computer, a camera, a desktop computer, a set-top box, a television, a display device, a digital media player, a video game console, a video streaming device (for example, a content service server or a content distribution server), a broadcast receiving device, a broadcast transmitting device, or a monitoring device, and may not use or use any type of operating system. Alternatively, the electronic device 300 may be a device in a cloud computing scenario, for example, a virtual machine in the cloud computing scenario. In some cases, the electronic device 300 may be equipped with a component for wireless communication. Therefore, the electronic device 300 may be a wireless communication device, or a device having a structure similar to that in FIG. 7. In addition, the composition structure shown in FIG. 7 does not constitute a limitation on the electronic device 300. In addition to the components shown in FIG. 7, the electronic device 300 may include more or fewer components than those shown in FIG. 7, or combine some components, or have different component deployments.

Alternatively, the electronic device 300 may be a chip system. The chip system may include a chip, or may include a chip and another discrete device. In addition, for actions, terms, and the like in embodiments of this application, refer to each other. This is not limited. In embodiments of this application, names of messages exchanged between devices, names of parameters in the messages, or the like are merely examples. Other names may alternatively be used during specific implementation. This is not limited.

In still another possible implementation, the transceiver module 201 in FIG. 6 may be replaced with the transceiver 302 in FIG. 7, and a function of the transceiver module 201 may be integrated into the transceiver 302. The processing module 202 may be replaced with the processor 307, and a function of the processing module 202 may be integrated into the processor 307. Further, the data transmission apparatus 200 shown in FIG. 6 may further include a memory (not shown in the figure). When the transceiver module 201 is replaced with a transceiver, and the processing module 202 is replaced with a processor, the data transmission apparatus 200 in embodiments of this application may be the electronic device 300 shown in FIG. 7.

Figure 8:
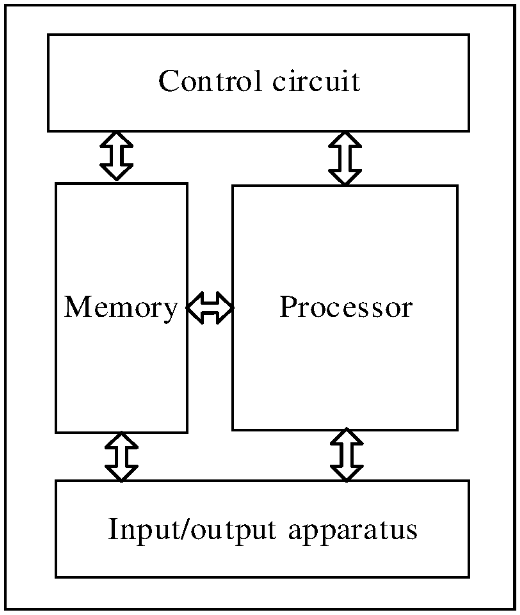
FIG. 8 is a schematic diagram of a structure of another data transmission apparatus according to an embodiment of this application.

FIG. 8 is a schematic diagram of a structure of another data transmission apparatus according to an embodiment of this application. The data transmission apparatus is applicable to the scenario shown in the foregoing method embodiment. For ease of description, FIG. 8 shows only main components of the data transmission apparatus, including a processor, a memory, a control circuit, and an input/output apparatus. The processor is mainly configured to process a communication protocol and communication data, execute a software program, and process data of the software program. The memory is mainly configured to store the software program and data. The control circuit is mainly configured to supply power and transmit various electrical signals. The input/output apparatus is mainly configured to receive data input by a user and output data to the user.

When the data transmission apparatus is an access device or a terminal device, the control circuit is a main board, the memory includes a medium having a storage function, such as a hard disk, a RAM, or a ROM, the processor may include a baseband processor and a central processing unit, the baseband processor is mainly configured to process the communication protocol and the communication data, the central processing unit is mainly configured to control an entire network device, execute the software program, and process the data of the software program, and the input/output apparatus includes a display, a keyboard, a mouse, and the like. The control circuit may further include or be connected to a transceiver circuit or a transceiver, for example, a network cable interface, and is configured to send or receive data or a signal, for example, perform data transmission and communication with another device. Further, the control circuit may further include an antenna, configured to receive and send a radio signal and perform data/signal transmission with another device.

According to the methods provided in embodiments of this application, this application further provides a computer program product. The computer program product includes computer program code. When the computer program code is run on a computer, the computer is enabled to perform the method according to any one of embodiments of this application.

An embodiment of this application further provides a computer-readable storage medium. All or some of the procedure in the foregoing method embodiments may be implemented by a computer or an apparatus having an information processing capability by executing a computer program or instructions to control related hardware. The computer program or the group of instructions may be stored in the foregoing computer-readable storage medium. When the computer program or the group of instructions are executed, the procedure in the foregoing method embodiments may be performed. The computer-readable storage medium may be an internal storage unit of the terminal device (including a data transmit end and/or a data receive end) in any one of the foregoing embodiments, for example, a hard disk or a memory of the terminal device. The computer-readable storage medium may also be an external storage device of the terminal device, for example, a plug-in hard disk, a smart media card (SMC), a secure digital (SD) card, or a flash card that is configured on the terminal device. Further, the computer-readable storage medium may alternatively include both an internal storage unit of the terminal device and an external storage device. The computer-readable storage medium is configured to store the computer program or the instructions, and other programs and data required by the terminal device. The computer-readable storage medium may be further configured to temporarily store data that has been output or is to be output.

A person of ordinary skill in the art may be aware that, in combination with the examples described in embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments. Details are not described herein again.

In the several embodiments provided in this application, it should be understood that the disclosed system, apparatus, and method may be implemented in other manners. For example, the described apparatus embodiment is merely an example. For example, division into the units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of embodiments.

In addition, functional units in embodiments of this application may be integrated into one processing unit, each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions in this application essentially, or the part contributing to the conventional technology, or a part of the technical solutions may be implemented in a form of a software product. The computer software product is stored in a storage medium and includes several instructions for instructing a computer device (a personal computer, a server, a network device, or the like) to perform all or a part of the steps of the methods in embodiments of this application. The foregoing storage medium includes any medium that can store program code, such as a USB flash drive, a removable hard disk, a read-only memory (ROM), a random access memory (RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A data transmission method, the method comprising:

sending a first multicast frame to a plurality of terminal devices;

receiving multicast block acknowledgment frames respectively from the plurality of terminal devices, wherein the multicast block acknowledgment frame from a given terminal device comprises an acknowledgment field that indicates whether the given terminal device receives at least one frame comprised in the first multicast frame, and a transmit channel of the first multicast frame is different from a receive channel of the multicast block acknowledgment frame;

based on determining, based on the acknowledgment field comprised in the multicast block acknowledgment frame from any terminal device in the plurality of terminal devices, that the any terminal device does not receive a target frame in the first multicast frame, resending the target frame to the plurality of terminal devices; and based on the multicast block acknowledgment frame from the any terminal device being not received, sending a multicast block acknowledgment request frame to the any terminal device, wherein the transmit channel of the first multicast frame is different from a transmit channel of the multicast block acknowledgment request frame;

wherein the receiving the multicast block acknowledgment frames respectively from the plurality of terminal devices comprises:

receiving the multicast block acknowledgment frame from the any terminal device based on multicast block acknowledgment request frame.

2. The method according to claim 1, wherein the first multicast frame comprises a plurality of frames, and the method further comprises:

obtaining the plurality of frames; and aggregating the plurality of frames to obtain at least one aggregated frame, wherein the at least one aggregated frame forms the first multicast frame;

wherein the sending the first multicast frame to the plurality of terminal devices comprises:

sequentially sending the at least one aggregated frame to the plurality of terminal devices.

3. The method according to claim 1, wherein the first multicast frame is located in a target priority queue, each frame of the at least one frame has a frame sequence number, and the frame sequence number of each frame of the at least one frame is within a frame sequence number range of a send window corresponding to the target priority queue; and wherein a value of the acknowledgment request field is a current start frame sequence number of the send window corresponding to the target priority queue, and the acknowledgment request field is for requesting a status of receiving, by the any terminal device, a frame with each frame sequence number in the send window corresponding to the target priority queue.

4. The method according to claim 1, wherein the multicast block acknowledgment request frame further comprises multicast location information, and the any terminal device is configured to determine the first multicast frame from a plurality of received multicast frames based on the multicast location information.

5. The method according to claim 4, wherein the multicast location information comprises a media access control (MAC) address field of a transmit channel, a MAC address field of a receive channel, and a traffic identifier (TID) field; and wherein the MAC address field of the transmit channel indicates a MAC address of a channel that is in an access device and that is for generating the multicast block acknowledgment request frame, the MAC address field of the receive channel indicates a MAC address of a channel that is in the any terminal device and that is for processing the multicast block acknowledgment request frame, and the TID field indicates the target priority queue.

6. The method according to claim 1, wherein the resending the target frame to the plurality of terminal devices comprises:

repeatedly performing a retransmission process until a retransmission end condition is satisfied;

wherein the retransmission process comprises:

sending the target frame to the plurality of terminal devices;

receiving the multicast block acknowledgment frames respectively from the plurality of terminal devices; and determining, based on the multicast block acknowledgment frames, whether each terminal device of the plurality of terminal devices receives the target frame; and wherein the retransmission end condition comprises at least one of the following: a quantity of times of repeated sending is greater than a quantity-of-times threshold and at least one terminal device of the plurality of terminal devices still does not receive the target frame, each terminal device of the plurality of terminal devices receives the target frame, or a duration of the retransmission process is greater than a duration threshold.

7. The method according to claim 6, wherein the first multicast frame is located in a target priority queue, the at least one frame each has a frame sequence number, the frame sequence number of the at least one frame is within a frame sequence number range of a send window corresponding to the target priority queue, and the sending the target frame to the plurality of terminal devices comprises:

aggregating the target frame and at least one current to-be-transmitted frame to obtain a second multicast frame, wherein a frame sequence number of the at least one to-be-transmitted frame is within the frame sequence number range of the send window corresponding to the target priority queue; and sending the second multicast frame to the plurality of terminal devices.

8. The method according to claim 1, wherein the first multicast frame is located in a target priority queue, the at least one frame each has a frame sequence number, the frame sequence number of the at least one frame is within a frame sequence number range of a send window corresponding to the target priority queue, a minimum frame sequence number of the at least one frame is a start frame sequence number of the send window corresponding to the target priority queue, and the method further comprises:

updating the frame sequence number range based on a frame with the minimum frame sequence number in the at least one frame being a non-target frame.

9. A data transmission method, the method comprising:

receiving a first multicast frame from an access device, wherein the first multicast frame is located in a target priority queue, the first multicast frame has a frame sequence number, and the frame sequence number is within a frame sequence number range of a receive window corresponding to the target priority queue; and sending a multicast block acknowledgment frame to the access device, wherein the multicast block acknowledgment frame comprises an acknowledgment field that indicates whether at least one frame comprised in the first multicast frame is received, wherein the access device is configured to resend the target frame based on the acknowledgment field comprised in the multicast block acknowledgment frame indicating that a target frame in the first multicast frame is not received, and a receive channel of the first multicast frame is different from a transmit channel of the multicast block acknowledgment frame;

wherein the sending the multicast block acknowledgment frame to the access device comprises:

receiving a multicast block acknowledgment request frame from the access device, wherein the receive channel of the first multicast frame is different from a receive channel of the multicast block acknowledgment request frame; and sending the multicast block acknowledgment frame to the access device based on the multicast block acknowledgment request frame.

10. The method according to claim 9, wherein the at least one frame forms at least one aggregated frame.

11. The method according to claim 9, wherein the first multicast frame is located in the target priority queue, the at least one frame each has a frame sequence number, and a frame sequence number of any frame in the at least one frame is within the frame sequence number range of the receive window corresponding to the target priority queue or is less than a start frame sequence number of the receive window corresponding to the target priority queue; and wherein the acknowledgment field indicates a status of receiving a frame with each frame sequence number in the receive window corresponding to the target priority queue.

12. The method according to claim 11, wherein the multicast block acknowledgment frame further comprises multicast location information, and the access device is configured to determine, based on the multicast location information, that the acknowledgment field indicates a status of receiving the first multicast frame.

13. The method according to claim 12, wherein the multicast location information comprises a media access control (MAC) address field of a transmit channel, a MAC address field of a receive channel, and a traffic identifier TID field; and wherein the MAC address field of the transmit channel indicates a MAC address of a channel that is in a terminal device and that is for generating the multicast block acknowledgment frame, the MAC address field of the receive channel indicates a MAC address of a channel that is in the access device and that is for processing the multicast block acknowledgment frame, and the TID field indicates the target priority queue.

14. The method according to claim 9, further comprising:

updating the frame sequence number range of the receive window corresponding to the target priority queue based on the multicast block acknowledgment request frame.

15. The method according to claim 9, further comprising:

updating the frame sequence number range of the receive window corresponding to the target priority queue based on the first multicast frame.

16. A data transmission system, comprising:

an access device; and a terminal device;

wherein the access device is configured to:

send a first multicast frame to a plurality of terminal devices, wherein the plurality of terminal devices includes the terminal device;

wherein the terminal device is configured to:

receive the first multicast frame from the access device, wherein the first multicast frame is located in a target priority queue, the first multicast frame has a frame sequence number, and the frame sequence number is within a frame sequence number range of a receive window corresponding to the target priority queue; and send a multicast block acknowledgment frame to the access device, wherein the multicast block acknowledgment frame comprises an acknowledgment field that indicates whether at least one frame comprised in the first multicast frame is received and a receive channel of the first multicast frame is different from a transmit channel of the multicast block acknowledgment frame;

wherein the sending the multicast block acknowledgment frame to the access device comprises:

receiving a multicast block acknowledgment request frame from the access device, wherein the receive channel of the first multicast frame is different from a receive channel of the multicast block acknowledgment request frame; and sending the multicast block acknowledgment frame to the access device based on the multicast block acknowledgment request frame;

wherein the access device is configured to:

receive the multicast block acknowledgment frame from the terminal device, wherein a transmit channel of the first multicast frame is different from a receive channel of the multicast block acknowledgment frame; and resend the target frame to the terminal device based on the acknowledgment field comprised in the multicast block acknowledgment frame indicating that a target frame in the first multicast frame is not received by the terminal device;

wherein the access device is further configured to:

based on the multicast block acknowledgment frame from the terminal device being not received, send a multicast block acknowledgment request frame to the terminal device, wherein the transmit channel of the first multicast frame is different from a transmit channel of the multicast block acknowledgment request frame.

* * * * *